United States Patent [19]

Abramson et al.

[11] Patent Number: 5,269,013
[45] Date of Patent: Dec. 7, 1993

[54] ADAPTIVE MEMORY MANAGEMENT METHOD FOR COUPLED MEMORY MULTIPROCESSOR SYSTEMS

[75] Inventors: Kenneth D. Abramson, Seattle; David A. Orbits; H. Bruce Butts, Jr., both of Redmond, all of Wash.

[73] Assignee: Digital Equipment Corporation, Maynard, Mass.

[21] Appl. No.: 674,077

[22] Filed: Mar. 20, 1991

[51] Int. Cl.$^5$ ............................................. G06F 13/14
[52] U.S. Cl. .............................. 395/425; 364/DIG. 1; 364/228.1; 364/229.1; 364/229.2; 364/243.4
[58] Field of Search ... 364/200 MS File, 900 MS File; 395/400, 425

[56] References Cited

U.S. PATENT DOCUMENTS

| | | | |
|---|---|---|---|
| 4,403,286 | 9/1983 | Fry et al. | 395/650 |
| 4,463,424 | 7/1984 | Mattson et al. | 364/300 |
| 4,571,672 | 2/1986 | Hatada et al. | 395/425 |
| 4,591,977 | 5/1986 | Nissen et al. | 395/200 |
| 4,633,387 | 12/1986 | Hartung et al. | 395/650 |
| 4,636,946 | 1/1987 | Hartung et al. | 395/425 |
| 4,638,424 | 1/1987 | Beglin et al. | 395/425 |
| 4,771,375 | 9/1988 | Beglin et al. | 395/425 |
| 4,811,216 | 3/1989 | Bishop et al. | 364/200 |
| 4,812,981 | 3/1989 | Chan et al. | 364/200 |
| 4,928,239 | 5/1990 | Baum et al. | 364/200 |
| 4,933,837 | 6/1990 | Freidin | 364/200 |
| 4,939,636 | 7/1990 | Nakagawa et al. | 395/425 |
| 4,980,822 | 12/1990 | Brantley, Jr. et al. | 364/200 |
| 5,043,885 | 8/1991 | Robison | 395/425 |
| 5,093,913 | 3/1992 | Bishop et al. | 395/650 |
| 5,117,350 | 5/1992 | Parrish et al. | 395/425 |
| 5,123,106 | 6/1992 | Otsuki et al. | 395/725 |
| 5,146,607 | 9/1992 | Sood et al. | 395/800 |

OTHER PUBLICATIONS

William J. Bolosky and Michael L. Scott, "Simple But Effective Techniques for NUMA Memory Management," University of Rochester, Rochester, N.Y., Mar. 1989.
Alan L. Cox and Robert J. Fowler, "The Implementation of a Coherent Memory Abstraction on a NUMA Multiprocessor: Experiences with Platinum" (Revised), University of Rochester, Rochester, N.Y., May 6, 1989.
Ming-Chit Tam, Jonathan M. Smith and David J. Farber, "A Taxonomy-Based Comparison of Several Distributed Shared Memory Systems," University of Pennsylvania, Philadelphia, Pa., May 15, 1990.
Robert H. Thomas and Will Crowther, "The Uniform System: An approach to runtime support for large scale shared memory parallel processors," Cambridge, Mass.

*Primary Examiner*—Joseph L. Dixon
*Assistant Examiner*—Hiep T. Nguyen
*Attorney, Agent, or Firm*—Christensen, O'Connor, Johnson & Kindness

[57] ABSTRACT

An adaptive memory management method for coupled memory multiprocessor computer systems is disclosed. In a coupled memory multiprocessor system all the data and stack pages of processes assigned to individual multiprocessors are, preferably, located in a memory region coupled to the assigned processor. When this becomes impossible, some data and stack pages are assigned to global memory or memory regions coupled to other processors. The present invention is a method of making certain that the most referenced data and stack pages are located in the coupled memory of the processor to which a specific process is assigned and lesser referenced pages are located in global memory or the coupled memory region of other processors. This result is accomplished by sampling the memory references made by the processors of the computer system and causing the most recently referenced pages in each coupled memory region to be maintained at the head of an active page list. References to remote data and stack pages are stored in a remote page hash table. Remote pages are pages stored in global memory or in coupled memory other than the coupled memory of the processor to which the process owning the pages is assigned. Any remote data and stack pages referenced more frequently than pages stored in a processor's coupled memory region are transferred to the processor's coupled memory region. If a processor's coupled memory region is tight, pages are transferred from the processor's coupled memory region to global memory or to the coupled memory region of another processor.

21 Claims, 12 Drawing Sheets

FIG.4A.

| RELATIVE PAGE NUMBER | NEXT | PREVIOUS |
|---|---|---|
| 0 | 1 | 32768 |
| 1 | 2 | 0 |
| 2 | 3 | 1 |
| 3 | 4 | 2 |
| 4 | 5 | 3 |
| 5 | 6 | 4 |
| ... | ... | ... |
| 32762 | 32763 | 32761 |
| 32763 | 32764 | 32762 |
| 32764 | 32765 | 32763 |
| 32765 | 32766 | 32764 |
| 32766 | 32767 | 32765 |
| 32767 | 32768 | 32766 |
| LIST HEAD 32768 | 0 | 32767 |

FIG.4B.

| RELATIVE PAGE NUMBER | NEXT | PREVIOUS |
|---|---|---|
| 0 | 21567 | 6731 |
| 1 | 433 | 24110 |
| 2 | 10594 | 5 |
| 3 | 1892 | 32768 |
| 4 | 155 | 7882 |
| 5 | 2 | 32764 |
| ... | ... | ... |
| 32762 | 6211 | 13 |
| 32763 | 32768 | 18351 |
| 32764 | 5 | 67 |
| 32765 | 3217 | 166 |
| 32766 | 400 | 21931 |
| 32767 | 1557 | 882 |
| LIST HEAD 32768 | 3 | 32763 |

| PHYSICAL PAGE NUMBER | TEMPERATURE |
|---|---|
| 1233031 | 18 |
| 250970 | 155 |
| 2980352 | 0 |
| 4510041 | 0 |
| 734 | 334 |
| 91107 | 0 |

⋮

| | |
|---|---|
| 234133 | 58 |
| 78260 | 0 |
| 23411 | 64 |
| 23538 | 62 |
| 6876211 | 0 |
| 90195 | 0 |
| 1455933 | 71 |

*FIG.5.*

ADAPTIVE MEMORY MANAGEMENT METHOD FOR COUPLED MEMORY MULTIPROCESSOR SYSTEMS

TECHNICAL AREA

This invention relates to the memory management aspects of the operating system software of multiprocessor computer systems having a non-uniform memory access architecture (NUMA) memory system interconnect design.

BACKGROUND OF THE INVENTION

NUMA designs attempt to take advantage of memory hierarchy because a process suffers less memory access latency (and runs faster) the closer the processor running the process is to the memory serving the processor. If memory access requires using a system interconnect, the resulting latency is high, in some cases high enough to be prohibitive. In addition to memory access latency savings, maintaining a process's memory locally and providing local access reduces use of the system interconnect. Reducing use of the system interconnect allows either more processors to be connected to a given interconnect and/or faster processor speeds relative to the interconnect's bandwidth. Therefore, the primary goal of the memory management software used in a NUMA design is to store a process's most frequently used pages as close to the processor as possible. At the same time, the operating system must minimize the time and resources required to satisfy this goal.

Recently several experimental multiprocessor computer systems have been developed that attempt to reduce memory access latency by distributing system memory. Each of these systems includes multiple processors, each with a local memory interconnected by either a bus or a butterfly network and some amount of global memory. See *Parallel Programming Using the MMX Operating System and Its Processor* by E. Gabber in Proceedings of the Third Israel Conference Computer System Software Engineering, Tel-Aviv, Israel, Jun. 6-7, 1988, pp. 122-23; *The Advanced Computing Environment Multiprocessor Workstation* by A. Garcia, D. J. Foster and R. F. Freitas, IBM Research Report RC 14491 (#64901), IBM T. J. Watson Research Center, March 1989; *Butterfly TM Parallel Processor Overview*, BBN Report No. 6148, Version 1, Mar. 6, 1986; and *The Uniform System Approach to Programming the Butterfly TM Parallel Processor*, BBN Report No. 6149, Version 2, Jun. 16, 1986. As best understood, each of these systems requires explicit management of the local memory storage by either the complier or the application programmer. Memory management is not controlled by the operating system. Apparently some recent work at the University of Rochester has taken the Mach operating system and modified its memory management to treat local memory as a cache of pages stored in global memory. See *An Overview of PLATINUM: A Platform for Investigating Non-Uniform Memory* by R. Fowler and A. Cox, University of Rochester Technical Report 262, November 1988; and *The Implementation of a Coherent Memory Abstraction On an NUMA Multiprocessor: Experience With PLATINUM* by A. Cox and R. Fowler, University of Rochester Technical Report 263, May 1989. Because the University of Rochester approach does not allocate storage directly in local memory, it does not realize some of the interconnect bandwidth the savings achieved by the hereinafter-described invention. Moreover, treating local memory as a cache of pages in global memory has a number of disadvantages. First, treating local memory as a cache means that data stored in global memory is replicated in local memory. Thus, local memory does not add to overall system memory. Further, replicating data in system memory creates a high memory overhead, particularly because system memory is stored on a page basis and page sizes are relatively large. Recently, page sizes of 64K bytes have been proposed. In contrast cache memories store data in blocks of considerably smaller size. A typical cache block of data is 64 bytes. Thus, the "granularity" of the data replicated in system memory is considerably larger than the granularity of data replicated in cache memory. The large granularity size leads to other disadvantages. Greater interconnect bandwidth is required to transfer larger data granules than smaller data granules. Coherency problems are increased because of the likelihood that more processors will be contending for the larger granules than the number contending for smaller granules on a packet-to-packet basis.

Recently a new NUMA design microprocessor computer system incorporating coupled memory (sometimes hereinafter abbreviated throughout this disclosure as CM) has been developed. In a CM system, physical system memory resides on both CPU and memory-only modules. Regardless of where located, all memory appears as one common physical address space and is accessible by all processors of the system. The part of system memory that physically resides on a CPU module is known as a coupled memory or CM region. In addition to a CM region, the CPU modules each include a processor. Each processor accesses its coupled memory region (called a local reference) via a private port. The coupled memory regions of other modules and the memory-only modules (called remote references) are made via the system interconnect. The coupled memory region of each CPU module is considered separate, while the memory of all of the memory-only modules are grouped into one region known as global memory (sometimes abbreviated hereinafter as GM). Each CM region stores data of primary interest to the processor associated with that CM region, i.e., the processor of the same CPU module. This data primarily comprises the data and stack pages of processes assigned to the local processor. GM contains shared data that is used by more than one CPU and/or acts as an overflow resource when the CM region of a CPU module is insufficient. Although this invention is not limited to use in a CM model of a NUMA design, this model is used throughout the following description to explain the invention's details.

More details of a CM multiprocessor computer system are described in various patent applications filed before or contemporaneously with this application, namely U.S. patent application Ser. No. 07/649,844, entitled "Affinity Scheduling of Processes on Symmetric Multiprocessing Systems," filed Feb. 1, 1991; U.S. patent application Ser. No. 07/673,766, entitled "Coupled Memory Multiprocessor Computer System Including Cache Coherency Management Protocols" filed Mar. 20, 1991; U.S. patent application Ser. No. 07/673,132, entitled "Memory Management Method for Coupled Memory Multiprocessor Systems," filed Mar. 20, 1991, the subject matter of which is incorporated herein by reference. As described in those applications, one of the desires of CM multiprocessor computer systems is to maintain in the CM regions of each CPU module the data most frequently used by the processor of that CPU module. This is done in order to minimize use of the system interconnect and, thus, allow more processors or faster processors to be used with the same capacity interconnect. Unfortunately, all pages stored in the CM regions and in the GM regions are not used with equal frequency. Some memory pages are used more frequently than others. A remote data or stack page, i.e., a data or stack page stored in global memory, that is referenced once per second does not require the same interconnect bandwidth nor cause the same access latency delays as does a remote data or stack page referenced 10,000 times per second. Clearly, if there is only room for one more page in the CM region of the CPU module requiring access to these two pages, the choice is to bring in the more frequently referenced page, i.e., the data or stack page referenced 10,000 times per second. Unfortunately, the memory page references of any specific process are impossible to exactly predict. The present invention is directed to a method of adapting the memory of a coupled memory multiprocessor computer system to the dynamic needs of changing processes.

SUMMARY OF THE INVENTION

In accordance with this invention, an adaptive memory management method for coupled memory multiprocessor computer systems is disclosed. A coupled memory multiprocessor computer system includes a plurality of CPU modules, usually one or more global memory modules, a storage medium and a global interconnect for connecting the CPU, the global memory modules, and the storage medium together. Each CPU includes a processor and a coupled memory region. In accordance with this invention, all of a process's data and stack pages are located, when possible, in the CM region of the CPU module assigned to run the process. If this becomes impossible (if the sum of memory demands made by all the processes running on a given CPU module exceed the size of that CPU module's coupled memory), only the most frequently referenced subset of these pages that can be stored in the CM region are stored there. The remaining pages, which are by definition referenced less frequently, are stored in global memory or in the CM region of another CPU module.

When a process requests more memory for its data or stack segment, that memory is allocated in the CM region of the CPU module assigned to run the process if some coupled memory is available, or in global memory (or the CM region of another CPU module) if no free memory is available in the CPU module assigned to run the process. If, for some reason, a process migrates to another CPU module, its coupled memory pages are marked for migration as well. When the process runs on its new CPU module, each time process references one of the marked pages, the page is copied into the new coupled memory and the old page is freed. In this regard, it is preferable that each process run for its entire life on only one CPU module. This will yield the best benefit of coupled memory in terms of latency savings and reducing interconnect bandwidth. However, load balancing considerations may override these benefits, making it optimal to migrate a process from one CPU module to another.

In accordance with further aspects of this invention, memory references are sampled by hardware logic that forms a part of each CPU module. A system process, known as the adapt daemon, running on each processor, periodically checks a sample buffer that forms part of the hardware logic. Samples that relate to coupled memory pages cause those pages to be placed at the head of a memory page active page list for that coupled memory region. Remote data and stack page reference information is stored in a remote page hash table. If any remote data or stack pages are referenced more frequently by a given processor than the data or stack pages stored in the coupled memory region of the CPU module assigned to run a process, an incorrect set of pages are present in that coupled memory. When this happens, the adapt daemon marks the most highly referenced remote pages for migration into the coupled memory of the referencing CPU module when next referenced.

In accordance with other aspects of this invention, when a process references a remote (e.g., global) page that has been marked for migration, the page is copied into the coupled memory region of the CPU module assigned to run the process. If the coupled memory is still tight (very little free coupled memory exists), then one or more of the least active coupled memory pages are copied to global memory and those coupled memory pages freed. If the process causing the migration owns more coupled memory than it is allowed, the process must first free some of its own coupled memory pages. Otherwise, the least active coupled memory page is taken regardless of its owner. The selected page(s) are copied to global memory, and the CM page is freed.

Sampling memory reference frequency, and, when necessary, adjusting the physical placement of data, reduces memory access latency and system interconnect usage for all processes on the system. This, in turn, permits each process to perform its computing in less time, and allows more CPU modules to be connected to a given system interconnect before exhausting the interconnect's ability to handle memory traffic.

BRIEF DESCRIPTION OF THE DRAWINGS

The foregoing and other advantages of the present invention will become more readily appreciated as the same becomes better understood by reference to the following detailed description when taken in conjunction with the accompanying drawings wherein:

FIGS. 4A and 4B show sections of a coupled memory active page list, immediately after initialization (4A) and while a hypothetical load is placed on a running system (4B);

FIG. 5 shows sections of a remote page hash table when a hypothetical load that overcommits the resources of the related CPU module's coupled memory region is placed on a running system;

DESCRIPTION OF THE PREFERRED EMBODIMENT

Figure 1:
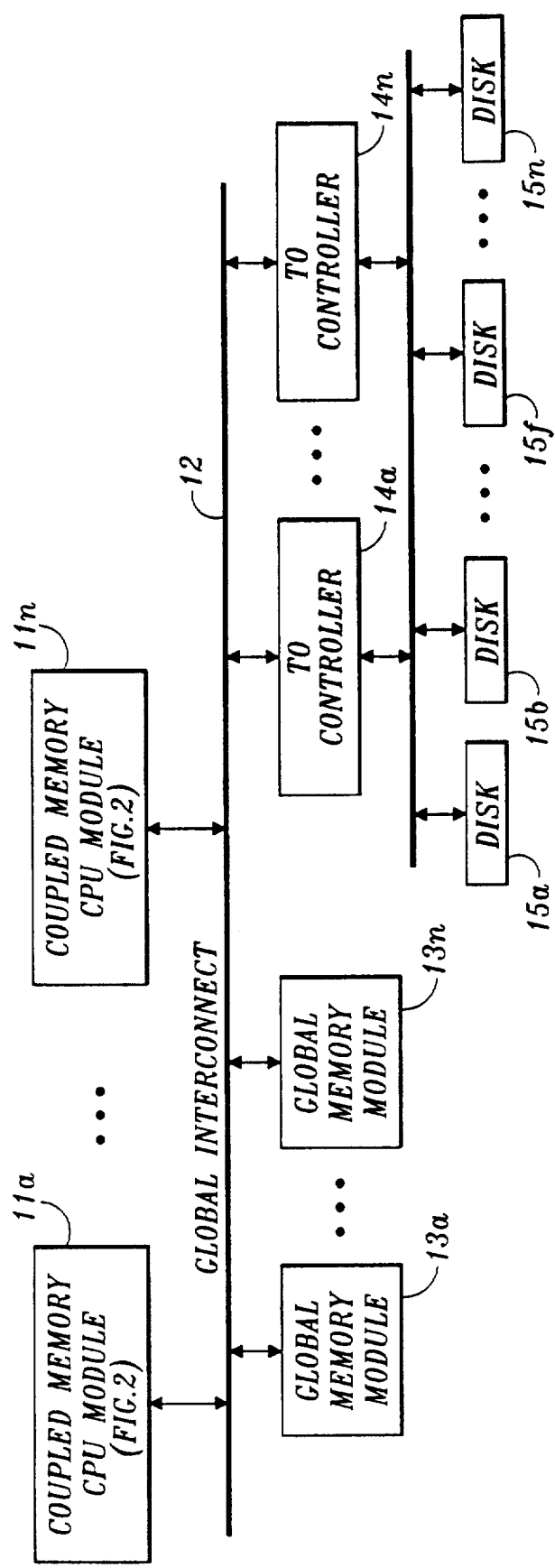
FIG. 1 is a block diagram of a coupled memory multiprocessor computer system incorporating the invention.

FIG. 1 illustrates a coupled memory multiprocessor computer system with which the invention finds use. The coupled memory multiprocessor computer system illustrated in FIG. 1 comprises a plurality of identical or substantially identical coupled memory CPU modules 11a,11b . . . 1n; a global interconnect 12; a number of global memory modules 13a,13b . . . 13n; a number of input/output (I/O) controllers 14a,14b . . . 14n; and permanent storage media, such as disks 15a,15b . . . 15n.

Figure 2:
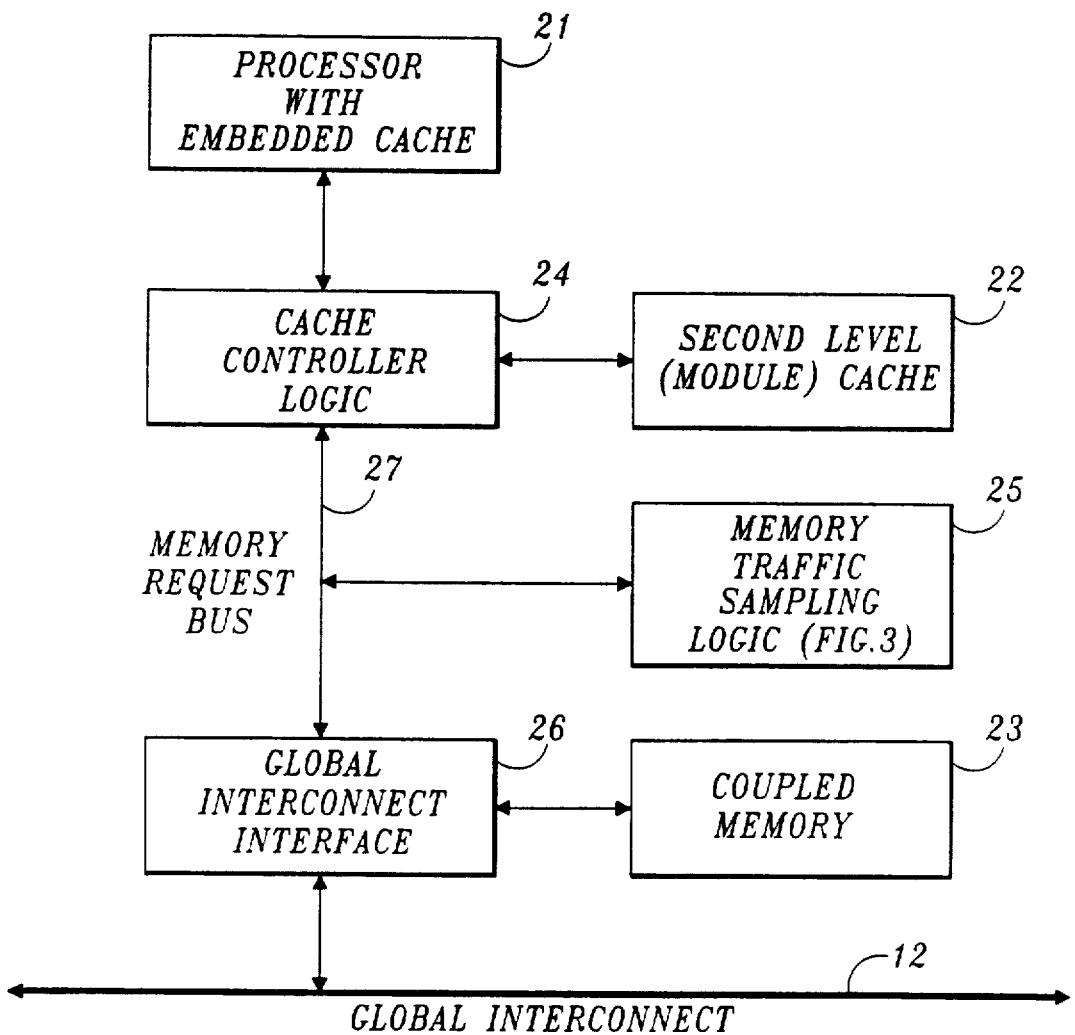
FIG. 2 is a block diagram of a CPU module suitable for use in the coupled memory multiprocessor computer system illustrated in FIG. 1.

FIG. 2 illustrates a CPU module suitable for use in the coupled memory multiprocessor computer system shown in FIG. 1. The CPU module 11 illustrated in FIG. 2 includes: a processor with an on-chip (i.e., embedded) cache memory 21; a second level (module) cache memory 22; a coupled memory region 23; cache controller logic 24; memory traffic sampling logic 25; a global interconnect interface 26; and a memory request bus 27. Also shown in FIG. 2 is the global interconnect 12.

As will be readily appreciated by those skilled in the art, from viewing FIGS. 1 and 2 and the foregoing description, the coupled memory multiprocessor computer system illustrated in FIG. 1 has five levels of memory hierarchy. Each higher level of memory hierarchy has greater data access latency than lower levels of memory. The first level is the cache memory integrated with the processor 21. This level has the shortest access latency. The second level of the hierarchy is the module cache memory 22. Level three is the coupled memory 23, which is directly coupled to the processor 21 and is considerably larger than the module cache memory 22. Level four is the global memory modules 13. The global memory modules are located where the traditional system memory in uniform memory access multiprocessor systems is located. This is the first hierarchical level requiring use of the global interconnect 12. Level five is the storage disks 15. Because the coupled memory 23 is directly coupled to its associated processor, it can be accessed without using the services of the global interconnect 12. On the other hand, if the processor of one CPU module 11a needs data from the coupled memory of another CPU module 11b, that data is available to the requiring CPU module 11a via the global interconnect 12. As a result, data, instructions, etc., stored in any memory location are available to all CPUs. This both preserves and efficiently implements the shared memory multiprocessor programming environment that is preferred by software engineers. Obviously, access latency is substantially less for a processor seeking data from its local coupled memory region than for a processor seeking data from the coupled memory region of another CPU module or from a global memory module.

The present invention is directed to providing a method of assigning memory so that the most frequently accessed data is physically closest to the processor using that data. More specifically, as will be better understood from the following description, the adaptive memory management method of the present invention detects sub-optimal memory reference activity patterns, such as frequent data references to data and stack pages in global memory 13a . . . 13n, and moves those pages into the coupled memory region 23 of the CPU module frequently referencing those pages. Once those pages are moved, further access takes less time and does not require using the global interconnect 12.

Coupled memory multiprocessor computer systems of the type illustrated in FIG. 1, as well as other types of multiprocessor computer systems, are, of course, controlled by an operating system. While an operating system can run on a processor that is independent of the processors 21 of the CPU modules 11a, 11b . . . 11n used to carry out processes associated with applications programs, preferably the processor of one of the CPU modules 11 is assigned the task of performing the functions of the operating system at system startup. Regardless of how the functions of the operating system are performed, the present invention, in essence, is a modification of the operating system designed to carry out the functions generally set forth above. Since the specific nature of the operating system can vary and does not form part of the present invention, a specific operating system is not described here. Rather, only the operating system modifications designed to carry out the present invention are described.

In order for the present invention to operate, it is necessary that processes have at least a soft affinity to a given CPU module, i.e., processes to be run on the multiprocessor system must be assigned to a specific CPU module when the processes are created. One way of creating process/CPU module affinity is described in U.S. patent application Ser. No. 07/649,844, entitled "Affinity Scheduling Processes on Symmetric Multiprocessing Systems," filed Feb. 1, 1991, the subject matter of which is incorporated herein by reference.

As shown in FIG. 2 this invention also requires that memory traffic sampling logic be added to each coupled memory CPU module. The memory traffic sampling logic 25 is coupled to the memory request bus 27 so that it can passively monitor all cache miss traffic, i.e., all references for data not stored in the cache memories.

Figure 3:
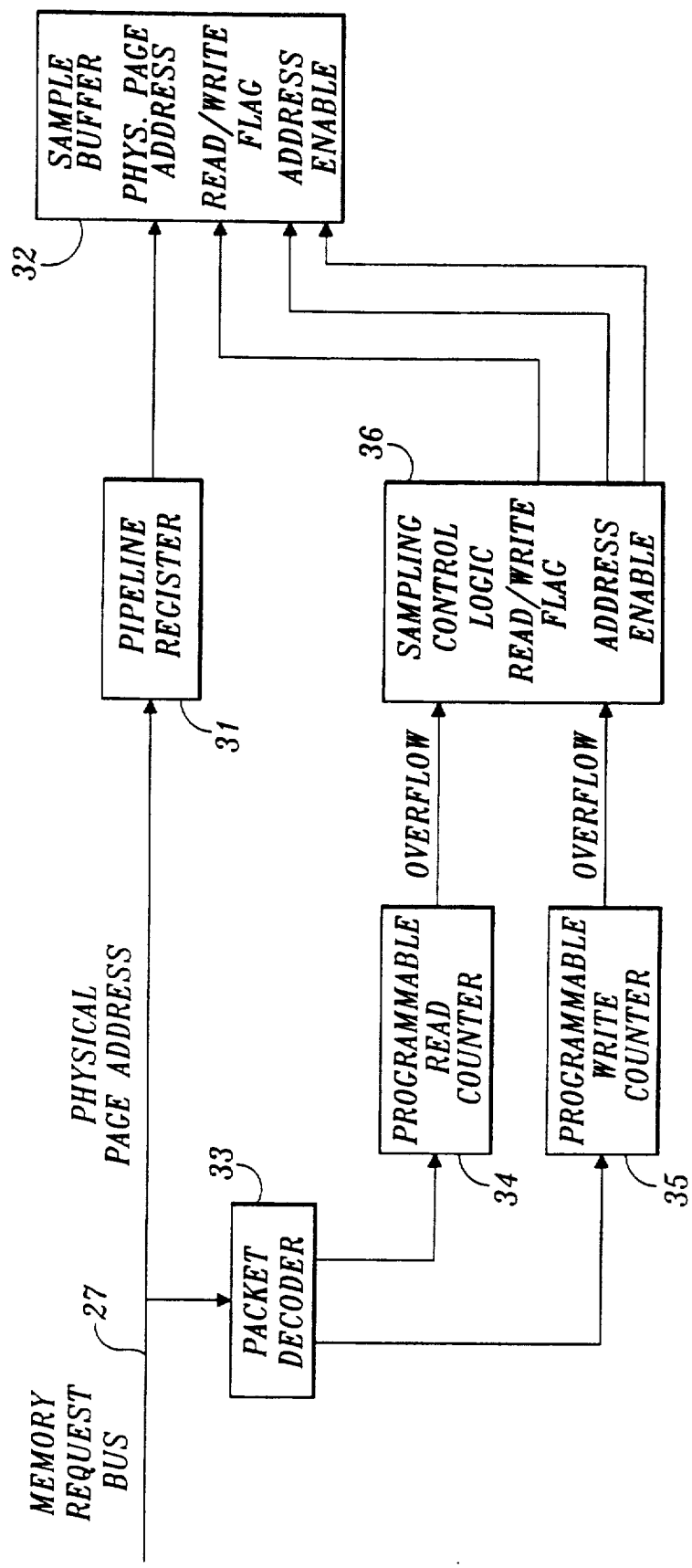
FIG. 3 is a block diagram of memory traffic sampling logic suitable for use in the CPU module illustrated in FIG. 2.

FIG. 3 is a high-level block diagram of memory traffic sampling logic suitable for use in the CPU modulus illustrated in FIG. 3. The block diagram includes a pipeline register 31, a sample buffer 32, a packet decoder 33, a programmable read counter 34, a programmable write counter 35, and sampling control logic 36. The command portion of each packet of data on the memory request bus 27 is decoded by the packet decoder 33. If the data packet is either a read or write command, the corresponding programmable read or write counter 34 or 35 is incremented. When the counting of either a read or a write operation produces an overflow from either the programmable read or write counter, the sampling control logic 35 is enabled. When the sampling control logic is enabled by a programmable read or write counter overflow, physical page address data stored in the pipeline register 31 of the page that caused the overflow is transferred to the sample buffer along with the status of a read/write indicator flag generated by the sampling control logic 36. The physical page address data and the read/write flag is stored at an address determined by a recirculating counter that forms part of the sampling control logic. The sampling control logic also produces an enable pulse that enables the writing of data into the sample buffer 32. The state of the read/write flag is controlled by which one of the programmable counters enabled the sampling control logic. The counter value is then reset to its programmable value, and the counting of data packets on the memory request bus resumes. The pipeline register 31 creates the delay necessary to make certain that the physical page address and the read/write indicator flag arrive at the sample memory simultaneously.

Preferably, the programmable read and write counters 34 and 35 are independently programmable to provide for variations in processor speed, overall cache effectiveness, and differences in cache read and write protocols. Programmability also allows adjustments in memory request sample rates to be made to suit processor workload.

The samples stored in the sample buffer are read via either the memory request bus 27 or via the processor auxiliary bus that is normally used for conducting basic functions, such as reading a boot PROM and special module housekeeping and error registers. Preferably, the sample port and programmable read and write counter reset values are mapped into the input/output address space of the processor of the CPU module containing the memory traffic sampling logic 25.

In order to better understand this invention, two data structures—an active page list (FIGS. 4A and 4B) and a remote page hash table (FIG. 5)—are explained before describing the software that uses them. The active page list is a doubly linked list implemented within an array. An active page list is maintained for the coupled memory region 23 of each CPU module 11a . . . 11n. Each active page list is a list of coupled memory region pages ordered by most frequent reference by the associated CPU. As shown in FIGS. 4A and 4B, each element of the array corresponds to a page of a coupled memory region. FIG. 4A shows the active page list after initialization; FIG. 4B is an example of an active page list after the system has been running for some time. As a result, the array element pertaining to a given page can be found directly using the page's relative page number within the coupled memory region. The head of the list is found directly by using an index not within the range of relative page numbers. More specifically, the example illustrated in FIGS. 4A and 4B lists 32768 ($2^{15}$) pages of coupled memory having relative page numbers 0 through 32767. The head of the list index is the next highest number, namely, 32768.

Figure 7:
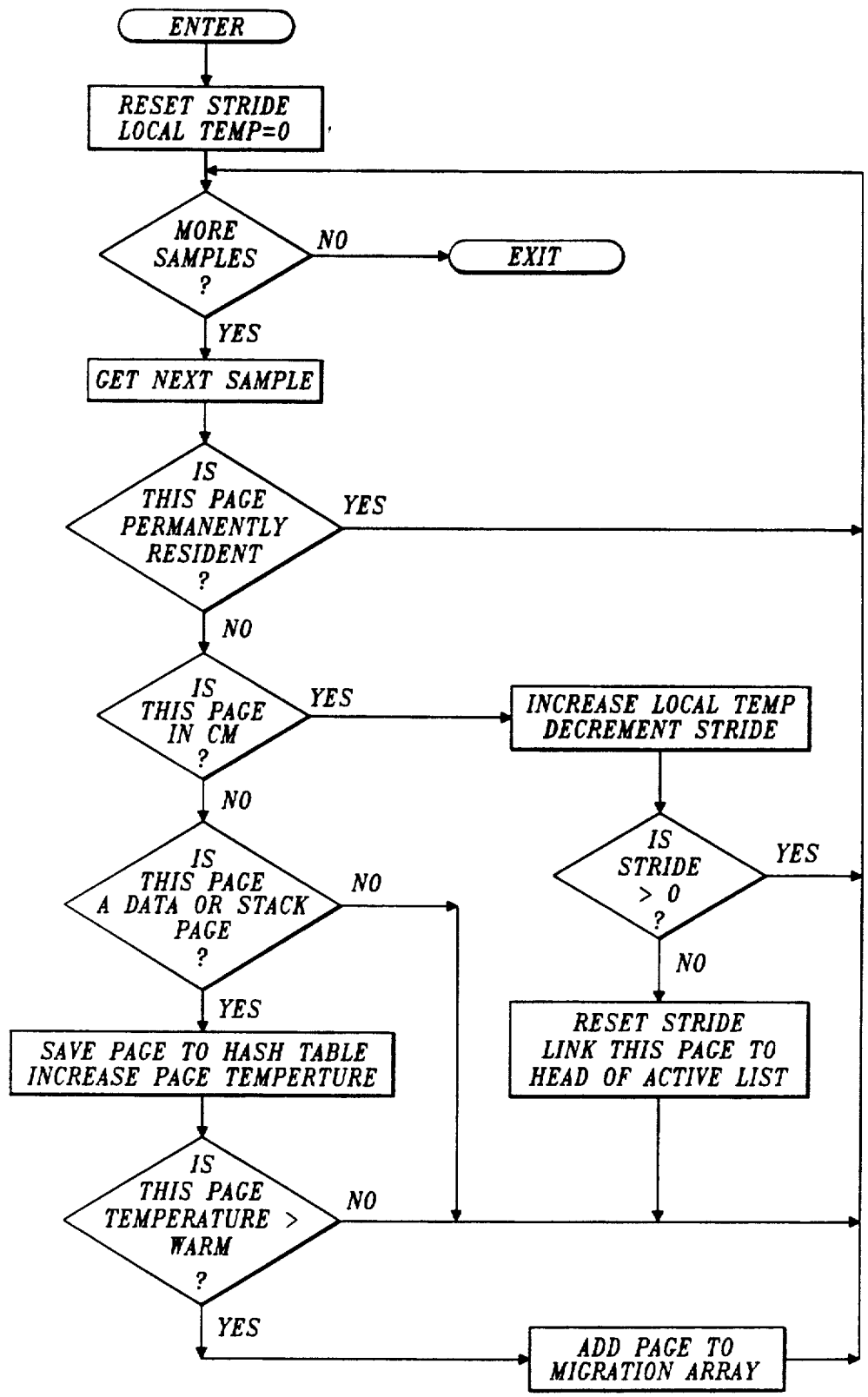
FIG. 7 is a flow diagram illustrating a collection phase suitable for use in the adapt daemon illustrated in FIG. 6.

As also shown in FIGS. 4A and 4B, each array element is composed of Next and Previous pointers, which are actual indexes into the array. The target of the Next pointer is the page that is linked to the head of an active page list next less recently referenced than the current page. (Linking a page to the head of the active page list is performed during the collection phase of an adapt daemon, which is shown in FIG. 7 and discussed in detail below.) The target of the Previous pointer is the page that is linked to the head of the active page list next more recently referenced than the current page. More specifically, the array elements, in essence, define an active page list. The head of the list is the most recently referenced page. Each following page is less recently referenced. Thus starting from the page at the head of the active page list, the Next pointer associated with that page indexes or identifies the next most recently referenced page, based on the samples stored in the sample buffer 32 of the memory traffic sampling logic. Successively following the Next pointers traces the list of pages in order of more recently referenced to less recently referenced. The Previous pointers go in the opposite direction, i.e., from less recently referenced to the next more recently referenced. Therefore, starting from the tail of the active page list and following successive Previous pointers traces the list of pages in order of least recently referenced to most recently referenced. As will be understood from the following discussion, the memory management routines of this invention commonly follow the Previous pointers from the tail of the active page list to find the least active pages so that the least active pages in a CM region are replaced when pages are to be replaced.

As noted above, FIG. 4A shows the active page list immediately after initialization. FIG. 4B is an example of what an active list might look like in a running system. In this example, the Next and Previous pages linked to the index (32768) that establishes the top of the active list are page 3 and page 32763. Page 3 is thus the list head element (i.e., the head of the active page list). Conversely, page number 32763 was linked to the top of the active page list less recently than any other page in the whole complete memory region. This is considered the least active page, i.e., it is the tail of the active page list.

FIG. 5 is an example of a remote page hash table in a running system with overcommitted coupled memory, i.e., in a system wherein the coupled memory region of a CPU module is insufficient to store all of the data and stack pages of the processes assigned to the processor of that CPU module. A similar data structure exists for each CPU module of the system. Each hash table is used to keep track of those pages that have been referenced by the related CPU module but not contained in the CPU module's coupled memory. A hash function is applied to the physical page number to arrive at the table index, as well as various retry functions to accommodate table collisions. Each hash table element contains a physical page number, and a temperature associated with that page.

As will be better understood from the following description, the metaphor temperature is used throughout this disclosure and in the drawings to indicate memory access frequency. A memory page that has a high rate of activity is considered hot, while an inactive page is cold. The temperature scale is continuous and directly reflects page reference activity. The temperature combines information about how frequently and how recently a CPU module has referenced the related page. A remote page temperature is increased by a sample weight with each detected reference by a CPU module. Periodically the page temperatures are decayed. Therefor a recent reference carries more weight than a reference further in the past. Temperatures that have decayed to zero invalidate the table element.

Figure 6:
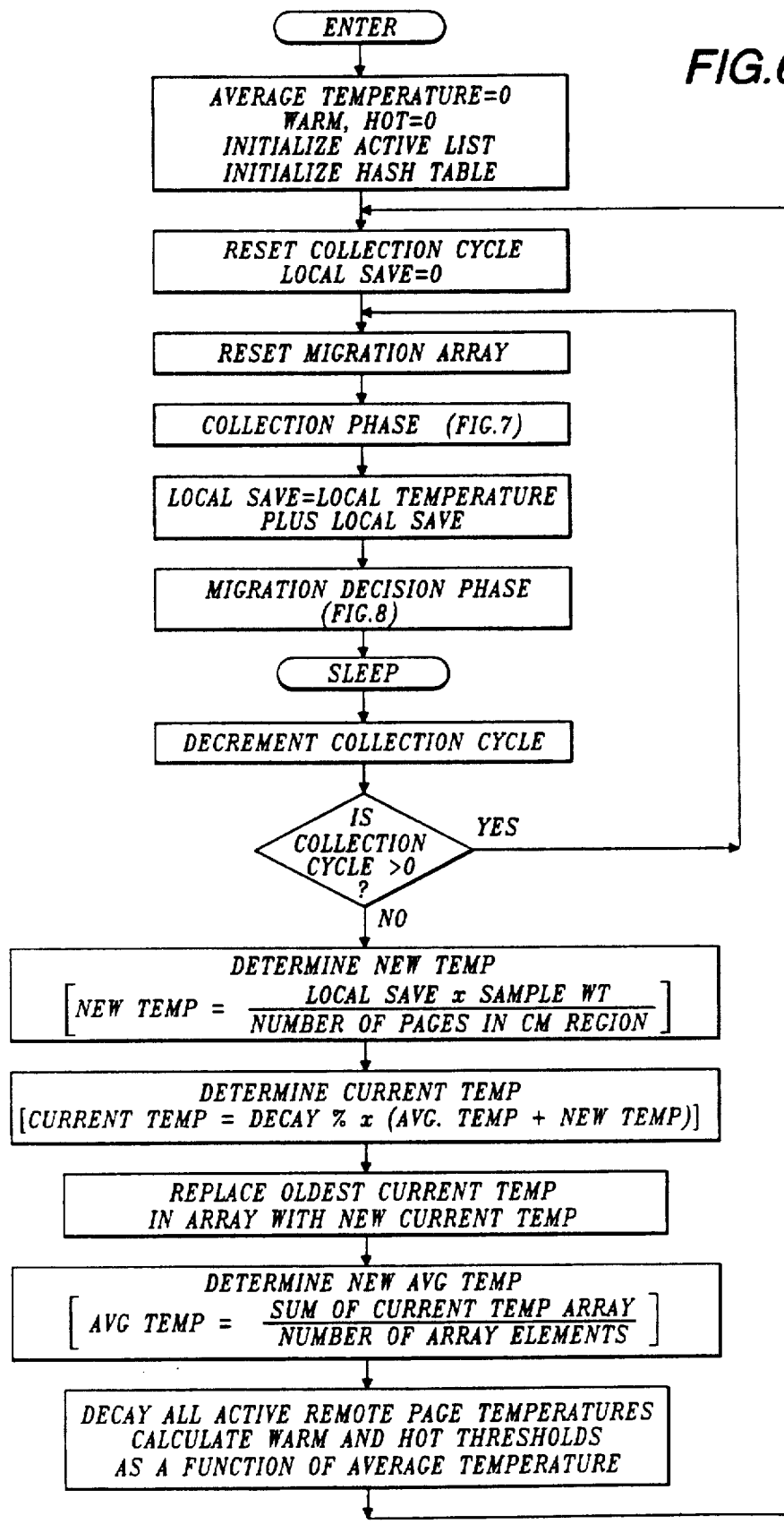
FIG. 6 is a flow diagram illustrating an adapt daemon suitable for running on each CPU module.

FIG. 6 is a flow diagram of an adapt daemon suitable for use by embodiments of this invention. An adapt daemon runs on each CPU module. The adapt daemons are initialized by the operating system software, never exit, and never migrate to another CPU module. As noted above, each adapt daemon has its own active page list and remote page hash table. The adapt daemon monitors the memory request bus 27 by reading the samples stored in the sample buffer 32 of the memory traffic sampling logic 25; makes decisions on whether or not a CPU's coupled memory 23 is being used efficiently; and performs tasks that set the necessary data structures to allow the page fault software (FIG. 10) to move pages into coupled memory 23 from global memory 13, if desirable.

On startup, the adapt daemon immediately initializes its own active page list and remote page hash table as shown in FIG. 4A. All hot and warm thresholds are set to zero as is the average page temperature of the coupled memory region of the related CPU module. As described below, the hot and warm thresholds are used in conjunction with remote page temperatures in making page migration decisions.

To prepare for a collection phase, the adapt daemon resets a collection cycle counter to a predetermined value that sets the number of collection cycles that are to be completed before the temperatures of the pages stored in the remote page hash table are decayed; and zeros a count of coupled memory region references over this decay interval, called a LOCAL SAVE count.

Further, the adapt daemon resets an array of frequently accessed remote (i.e., global) memory pages, called a MIGRATION ARRAY. The adapt daemon then reads the memory request bus samples stored in the sample buffer of the memory traffic sampling logic (FIG. 3) of the associated CPU module. This is called the collection phase and is shown in detail in FIG. 7 and discussed below. Briefly, the collection phase adds remote (i.e., global) memory pages with a temperature greater than the warm threshold to the MIGRATION ARRAY. After the collection phase is complete, the number of references to this coupled memory region over the sampling period, called LOCAL TEMPERATURE, is added to the LOCAL SAVE count.

Figure 8:
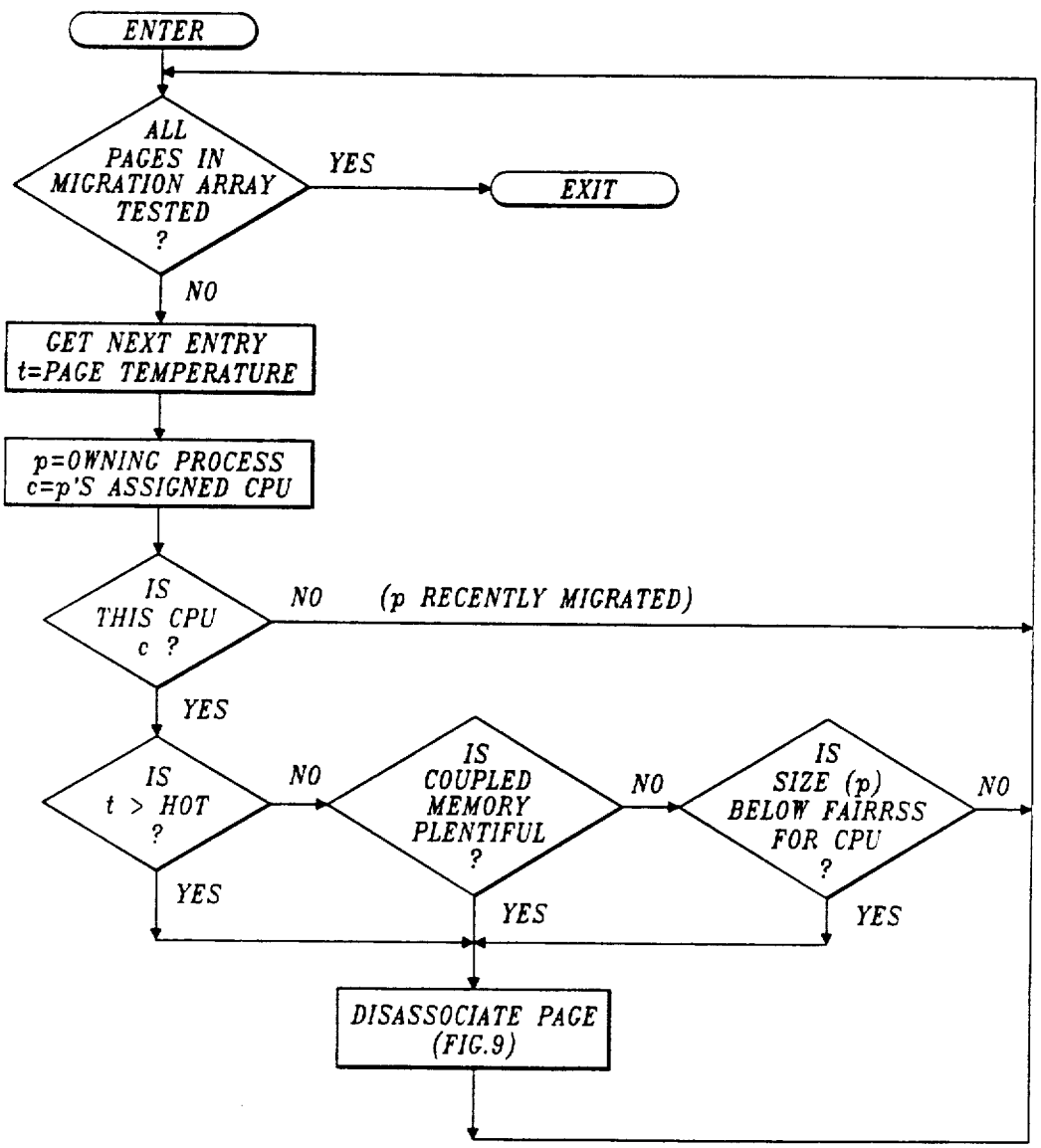
FIG. 8 is a flow diagram illustrating a page migration decision phase suitable for use in the adapt daemon illustrated in FIG. 6.

The adapt daemon then enters a migration decisions phase, which is shown in detail in FIG. 8 and discussed below. During the migration decisions phase decisions about sub-optimal page placement are made based on the MIGRATION ARRAY and the average coupled memory region temperature. When a decision to move a page is made, the adapt daemon performs the functions necessary to allow page fault software (FIG. 10) to move pages. The page dissociation preparatory functions are shown in detail in FIG. 9 and discussed below.

At the conclusion of the migration decisions phase the adapt daemon goes to sleep. When awakened by operating system scheduling software, the collection cycle counter is decremented and tested. If still greater than zero, the adapt daemon reenters the collection phase. If the collection cycle counter is not greater than zero, the adapt daemon calculates the average coupled memory region page temperature. The first step in the calculation sequence is the determination of the value of a factor called NEW TEMP. NEW TEMP is equal to LOCAL SAVE multiplied by a predetermined sample weight factor divided by the number of pages in the CM region. Next the value of a factor called CURRENT TEMP is determined. CURRENT TEMP is equal to a decay percent, designed to place a greater emphasis on the most recent samples, times a factor called AVG TEMP plus NEW TEMP. AVG TEMP is the average value of an array of CURRENT TEMP taken over a predetermined number of cycles to smooth out the temperature curve.

Next, the oldest CURRENT TEMP value in the CURRENT TEMP array is replaced with the new CURRENT TEMP value. Then a new AVG TEMP value is determined by summing the values of the CURRENT TEMP array and dividing the result by the number of elements included in the array.

After the new AVG TEMP value is determined, the hash table of active remote pages is decayed so that pages cool off when not referenced. This hash table of active remote pages and their temperatures is maintained indefinitely, though once a page temperature decays to zero it becomes inactive and its slot in the table is available for use by any page that hashes to that slot. Finally, the average temperature value (i.e., AVG TEMP) is used to compute the warm and hot thresholds to be used during the collection and migration decision phases (discussed below).

The purpose of the collection phase (FIG. 7) is to find which coupled memory pages have been the most active over the current sampling period, and which global (i.e., remote) memory data and stack pages have been referenced and how frequently. The adapt daemon determines this by reading the sample buffer provided by the memory traffic sampling logic 25 (FIG. 3) of the CPU module 11 on which the adapt daemon is running. The adapt daemon first zeros a current count of coupled memory page references (called LOCAL TEMP) and resets to a predetermined value an active page list stride count (called STRIDE), maintained by each adapt daemon. Then a test is made to determine if all of the entries of the sample buffer have been checked. If all entries have been checked, the collective phase ends. If not yet done checking the sample buffer entries, the next entry is checked. If the sample buffer entry relates to a page that is permanently resident memory (for example, some operating system data structures are permanently resident), the entry is ignored and the next sample processed. If the entry does not relate to a page that is to be ignored, the sampled page is checked to determine if it is in the CM region of the related CPU module. This is directly determined from the address of the page. If the page is located in the CM region 23 of the related CPU module, the LOCAL TEMP count is incremented and the STRIDE count is decremented. If the STRIDE count is greater than zero, the next sample is processed. If the STRIDE count is not greater than zero, the current page is linked to the top of the active page list, the STRIDE count is reset and the next sample processed. STRIDE is used solely to cut down on collection phase overhead. A STRIDE reset value of one causes every coupled memory region sample to be linked to the top of the active page list. A STRIDE reset value of two causes every other coupled memory region sample to be linked to the top of the active page list, etc. A higher STRIDE reset value results in less overhead but a less accurate active page list.

If the sampled page is remote, i.e., it is not located in the CM region of the associated CPU module, its page type is checked. If neither a data nor a stack page, the sample is ignored. If the page is either a data or stack page, the page address is saved in the remote page hash table (FIG. 5) and its temperature increased by the sample weight. If the page is now warm (page temperature greater than the warm threshold), the hash table entry (containing both the page and its temperature) is added to the MIGRATION ARRAY. Thus, the MI- GRATION ARRAY is an array of warm, remote pages that are interrogated during the migration decision phase. The next sample is then processed.

The purpose of the migration decision phase (FIG. 8) of the adapt daemon is to decide which, if any, global memory pages are referenced frequently enough to be moved into coupled memory. Pages determined to be migratable are prepared for migration by the adapt daemon, although the act of migration itself is carried out by a page fault routine (FIG. 10, discussed below).

The first step in the migration decision phase is a test to determine if all of the pages contained in the migration array of warm remote pages, built during the collection phase, have been interrogated. If all migration array pages have been interrogated, the migration decision phase is complete. If all of the migration array pages have not been interrogated, the next entry is interrogated and a term (t) is set equal to the temperature of that page. Next a determination of which process owns this page and which CPU module that process is assigned to run on are made. Terms p and c are set equal to these terms, respectively. If the process (p) owning this page is not assigned to the CPU module running this adapt daemon, the process must have recently migrated and the page is ignored. If the CPU module assigned to run the process matches the CPU module running this adapt daemon, the page temperature (t) is compared to the hot threshold (FIG. 6). If the page temperature is greater than hot, this page should be moved into the coupled memory region of the CPU module running this adapt daemon. As a result, the disassociate page routine (illustrated in FIG. 9 and described below) is called to prepare the page for migration. If the page temperature is not greater than hot, a test is made to determine if the amount of free memory in the coupled memory region of the CPU module running the adapt daemon is plentiful, i.e., above a predetermined level. If there is plenty of free memory available in the coupled memory region, the warm page is marked for migration by calling the disassociate page routine. If there is little free memory in the coupled memory region, a test is made to determine if the size of the owning process is relatively small, namely, below a factor designated CM FAIRRSS (described below), for the related CPU module. That is, if the amount of coupled memory owned by the process is less than the amount that process is allowed to use (FAIRRSS, also described below), this warm page is permitted to migrate to the CM region of the CPU module running the adapt daemon. As a result, the disassociate page routine is called to perform its functions. Thereafter, the next entry in the MIGRATION ARRAY is examined.

Figure 9:
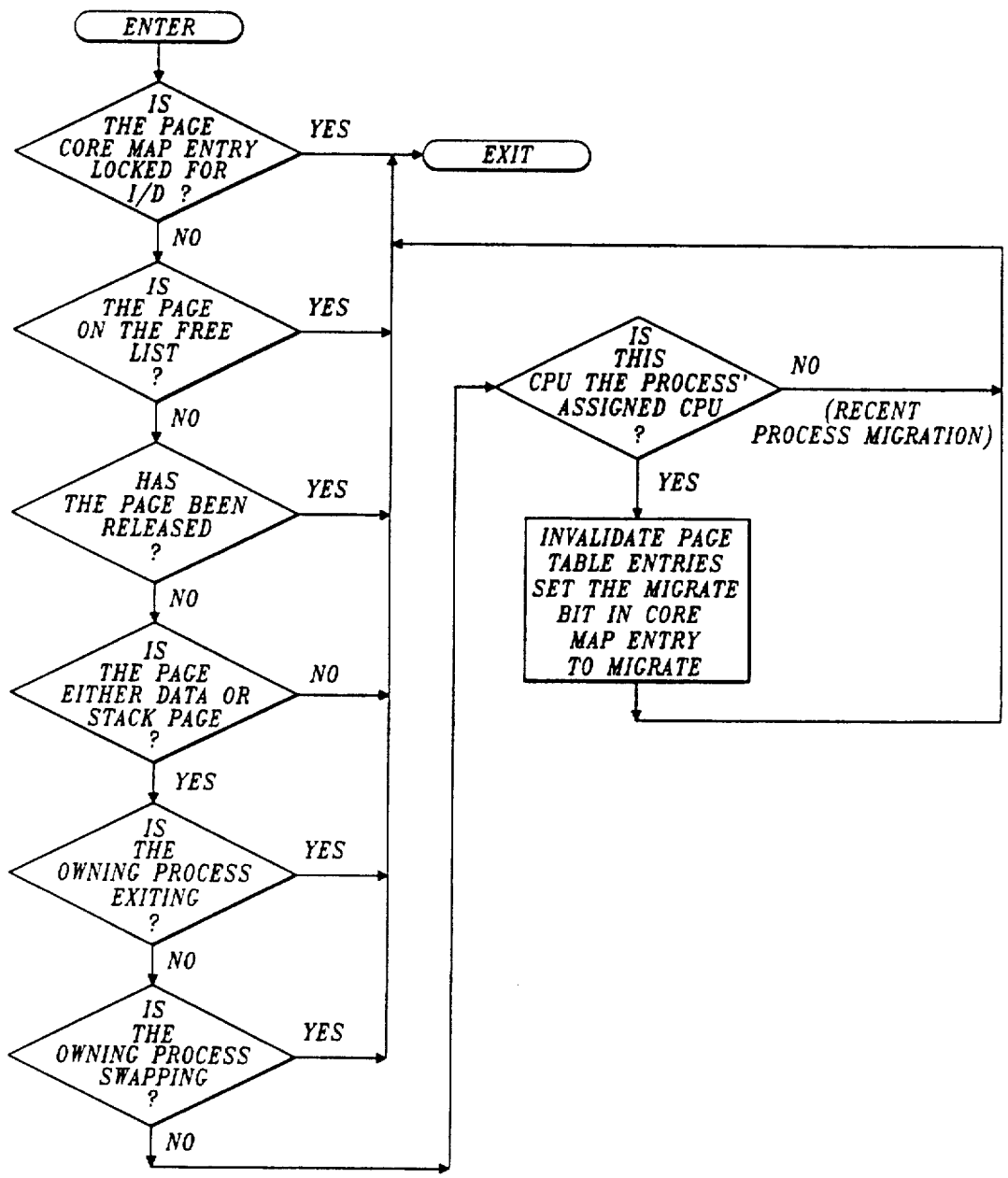
FIG. 9 is a flow diagram illustrating the steps of the disassociate page routine of the page migration decision phase illustrated in FIG. 8.

As noted above, the disassociate page routine (FIG. 9) is called to prepare a global memory page for migration into a coupled memory region. The disassociate page routine includes many tests performed to insure the integrity of data structures common to the system. As shown in FIG. 9, the bulk of these tests are performed at the beginning of the routine. While the illustrated order of the tests is not important, if any of the tests are not passed, nothing is done by the dissociate page routine. First, the core map entry is tested to determine if it is locked for I/O. Then a test is made to determine if the page has been put on the free list. Next, the page is tested to determine if it has been released. Then the page is tested to determine if it is a data or stack page. Next, a test is made to determine if the page's owning process is exiting. Then a test is made to determine if the page's owning process has swapped out or is in the process of swapping. Finally, a test is made to determine if the owning process is assigned to run on this (the adapt daemon's) CPU module. If the owning process is not assigned to run on this CPU module, the owning process must have recently migrated. If any of the tests are not passed, the disassociate page routine returns with nothing done. If none of the above conditions caused the disassociate page routine to reject the page, i.e., all of the tests are passed, the page is prepared for migration. This involves just two steps, although locks are required to insure data integrity across the CPU modules. First, the page table entries (there may be more than one page table entry for one logical page) in the owning process's page table space are invalidated. This will cause a page fault (see FIG. 10 and the following description) to occur the next time the page is referenced. Second, the migrate bit in the core map entry for this page is set. This tells the page fault code to migrate the page from global memory (or the CM region of another CPU module) to the CM region of the CPU module assigned to run the faulting process.

Figure 10:
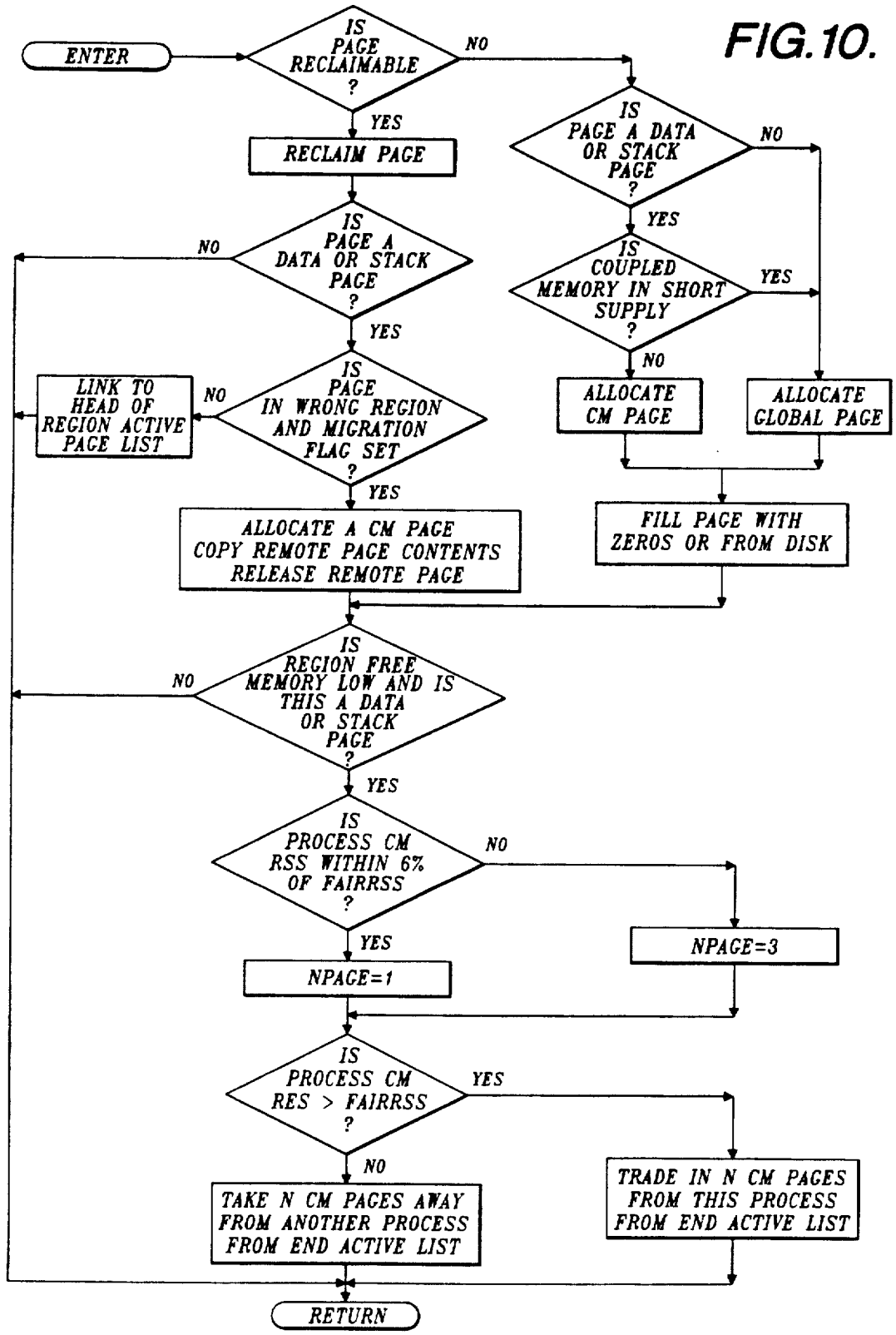
FIG. 10 is a flow diagram illustrating the steps taken by the operating system software during a page fault.

As illustrated in FIG. 10, when a page fault occurs, a test is made to determine if the page causing the fault is reclaimable. If the page is not reclaimable a test is made to determine if the page is a data or stack page. If the page is not a data or stack page, the page is allocated to global memory. If the page is a stack page, a test is made to determine if the coupled memory of the CPU module assigned to run the process that owns the page is in short supply. If the supply of coupled memory is short, the page is assigned to global memory. If there is sufficient coupled memory available, the page is allocated to the coupled memory region of the CPU module assigned to run the process. After allocation, the pages are either zeroed or filled from a file on disk.

A page is reclaimable if either (1) the page's valid bit is clear and the page is not on the free memory list of a CM region or (2) the page is on the free memory list of a CM region. The first case occurs when a clock algorithm is checking for references to pages and is referred to as a fast reclaim. The second case occurs when a clock algorithm has placed the page on the free list so that the page can be reallocated. Up until the time a page is reallocated the page can be reclaimed by the process that owns it. See U.S. patent application Ser. No. 07/473,766 entitled "Memory Management Method for Coupled Memory Multiprocessor System," filed Mar. 20, 1991, referenced above and incorporated herein by reference, for a more detailed description of clock algorithms and a fast reclaim.

Continuing with FIG. 10, if a page is reclaimable, it is reclaimed. Then the page is checked to see if it is a data or stack page. If the page is not a data or stack page, the page fault routine ends. If the page is a data or stack page, the page is checked to determine if the page is in the wrong memory region and has its migration flag set. If the page is in the CM region, the page is linked to the head of its regional active page list and the page fault routine ends. If the page is in the wrong memory region and the page's migrate flag is set, a page is allocated in the CM region of the CPU module that caused the fault, the contents of the remote page are copied into the allocated CM page and the remote page is released.

If CM demand is high, the invention is designed to ensure that each process gets its fair share of CM. Two routines are used to achieve this result. They are illustrated in the lower half of FIG. 10, and described below. Briefly, one routine, called takepage, removes CM pages from other processes that share a specific CM region, placing them on the free list. The other routine, called tradepage, removes CM pages from the current process, placing them on the free list. Both routines select the pages for the free list by scanning up from the tail of the active page list. As discussed above, these are the coupled memory pages that have been least recently referenced and, thus, should be the coldest.

There are a variety of ways to apportion the memory of a CM region among processes. The present invention has chosen to divide memory equally among contending processes. Once per second the invention calculates a quantity called the CM fair resident set size (CM FAIRRSS) by dividing the size of the CM region by the average process load on the related CPU module. Memory management (FIG. 10) and the adapt daemon (FIG. 8) use CM FAIRRSS to implement this policy by keeping the CM region of large processes below CM FAIRRSS and allowing small processes to grow to this limit. Processes may have much more total memory allocated than CM FAIRRSS, just not in the CM region of the CPU module to which a process is assigned. The remaining memory is either in global memory or in the CM region of other CPU modules.

Returning to FIG. 10, if the process CM resident set size (called CM RSS) is greater than the CM FAIRRSS for the CM region of the CPU module causing the page fault, tradepage forces the process to trade in three of its CM pages and places them on the free list. If CM RSS is less than the CM FAIRRSS, then takepage takes three pages away from other processes sharing the CM region. This prevents processes that start first on a CPU module from hogging the CM region of the CPU module and cause processes that start later to execute more slowly because most of their pages remain in global memory. To minimize page thrashing by takepage and tradepage, the invention uses a one-for-one replacement instead of three-for-one when the CM RSS of a process gets within $+/-6\%$ of CM FAIRRSS. As a process builds up its CM working set of pages, the processes WARM and HOT pages will migrate into the CM region of the assigned CPU module until the CM RSS of the process reaches CM FAIRRSS minus 6%. Thereafter, only HOT pages will migrate into the CM region. This strategy keeps HOT pages in coupled memory and splits a process's WARM pages between the coupled memory region of the CPU to which the process is assigned and global memory. As CM pages cool they are released, decreasing the process's CM RSS, allowing WARM pages of the process to migrate from global memory to the CM region of the CPU to which the process is assigned.

Figure 11:
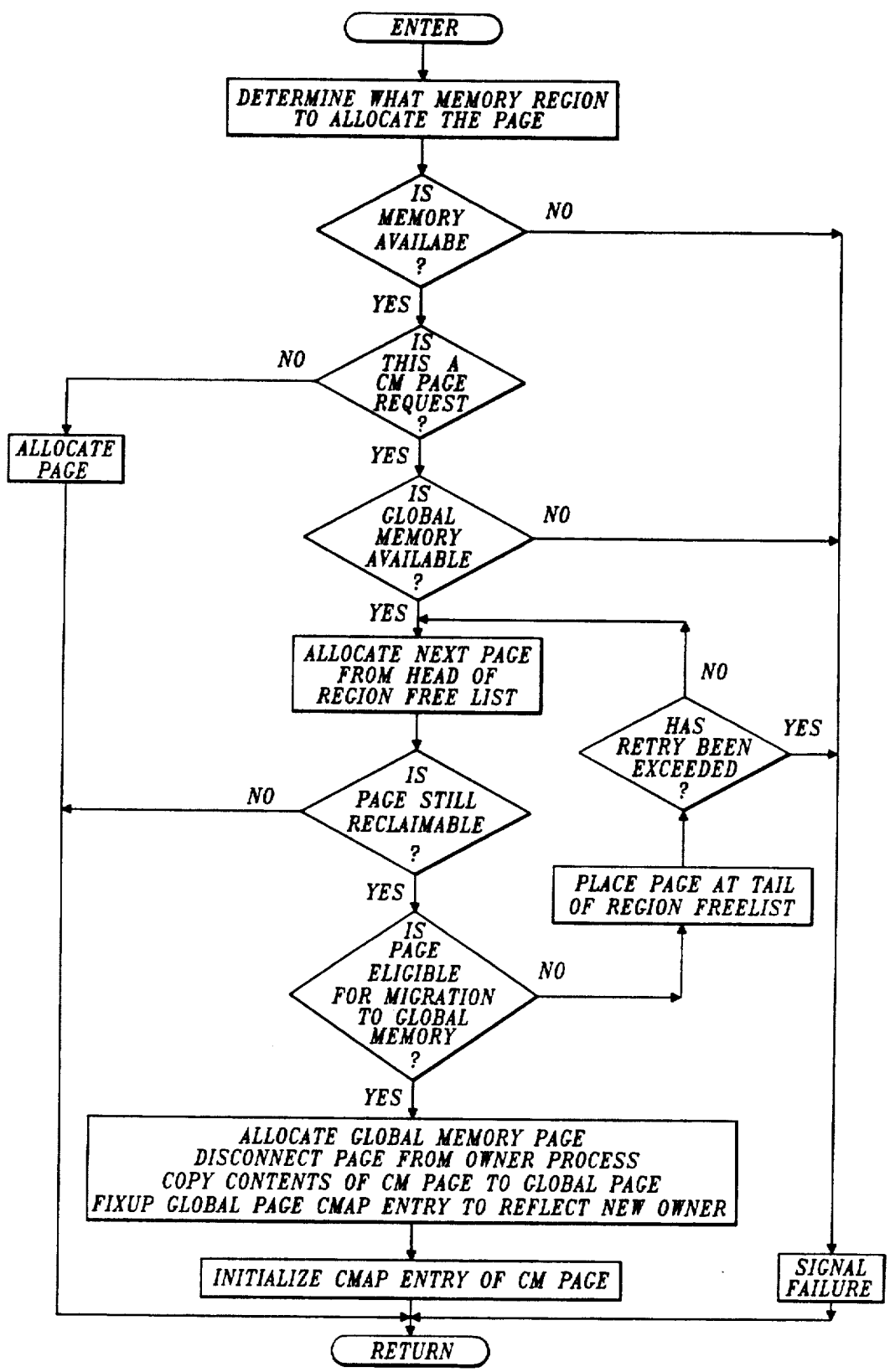
FIG. 11 is a flow diagram illustrating the steps taken to allocate one page of memory.

FIG. 11 illustrates a physical page allocation. The physical page allocation routine also takes care of migrating the contents of a reclaimable CM page to global memory when the CM page is reallocated.

The first step in the physical page allocation routine is to determine in which memory region a page is to be allocated. If the page is a newly created data or a stack page, the page will be allocated in a coupled memory region if space is available; otherwise, the page will be allocated in global memory. Next, a test is made to determine if memory is available in the designated memory region. If memory is not available, a signal failure is created and the physical page allocation routine ends. If memory is available, a test is made to determine if the allocation request is a CM page request, i.e., the allocation is in a CM region or global memory. If global memory is allocated the physical page allocation routine terminates.

If a remote page is to migrate to coupled memory, a coupled memory page is allocated. To allocate a CM page, the physical page allocation routine first checks to see if global memory is available if it is necessary to migrate the contents of a reallocated CM page to global memory. In this regard, the pages on the CM free page lists may be dirty. Dirty pages are pages that have been modified since they were originally transferred from disk to system memory. As a result, the corresponding disk pages are stale. Rather than transfer dirty pages from the CM regions to disk, dirty pages are first transferred to global memory. Later they are written to disk, if not reclaimed-thus the need to determine if global memory is available. The failure to allocate a page because either coupled memory or global memory is unavailable causes the caller to sleep until a paging daemon (FIG. 12) has created some free memory. If global memory is not available, a signal failure is produced and the physical page allocation routine ends.

Next a free page from the head of the CM free list is allocated and checked to see if it is still reclaimable. If the page is not reclaimable the physical page allocation routine ends. This case would occur when a process exits and deletes its virtual memory.

If the page is still reclaimable, the page is tested to see if the page is eligible for migration to global memory. The page must not be locked for I/O or pageout, must not be a system page or part of a shared memory segment, and the owning process must not be locked for swapping or about to exit. If the page is not eligible for migration to global memory, the page is placed at the tail of the CM free list and the next page from the head of the region free list is allocated. A retry test is included to terminate the loop in the event that all of the pages on the region free list are ineligible for migration.

If the CM page is eleigible for migration, a global memory page is allocated, the allocated page is disconnected from its owner process (if the global memory page was reclaimable), the contents of the CM page copied to the global memory page, and the PTE of the process that owned the CM page adjusted to point to the global memory page. Then the core map entry of the global memory page is initialized with the information from the core map entry of the CM page. Also, the core map entry of the CM page is initialized to correspond to its new owner. Then the physical page allocation routine ends.

Since the physical page allocation routine is called by the page fault routine and the page fault routine can run on any CPU module, the present invention relies on the fact that if a page is on a free list then the PTE that points to that page must be invalid and therefore the page cannot be in the translation buffer of any CPU module. If this requirement is violated, the present invention could migrate a page while it is being referenced, resulting in data corruption.

Figure 12:
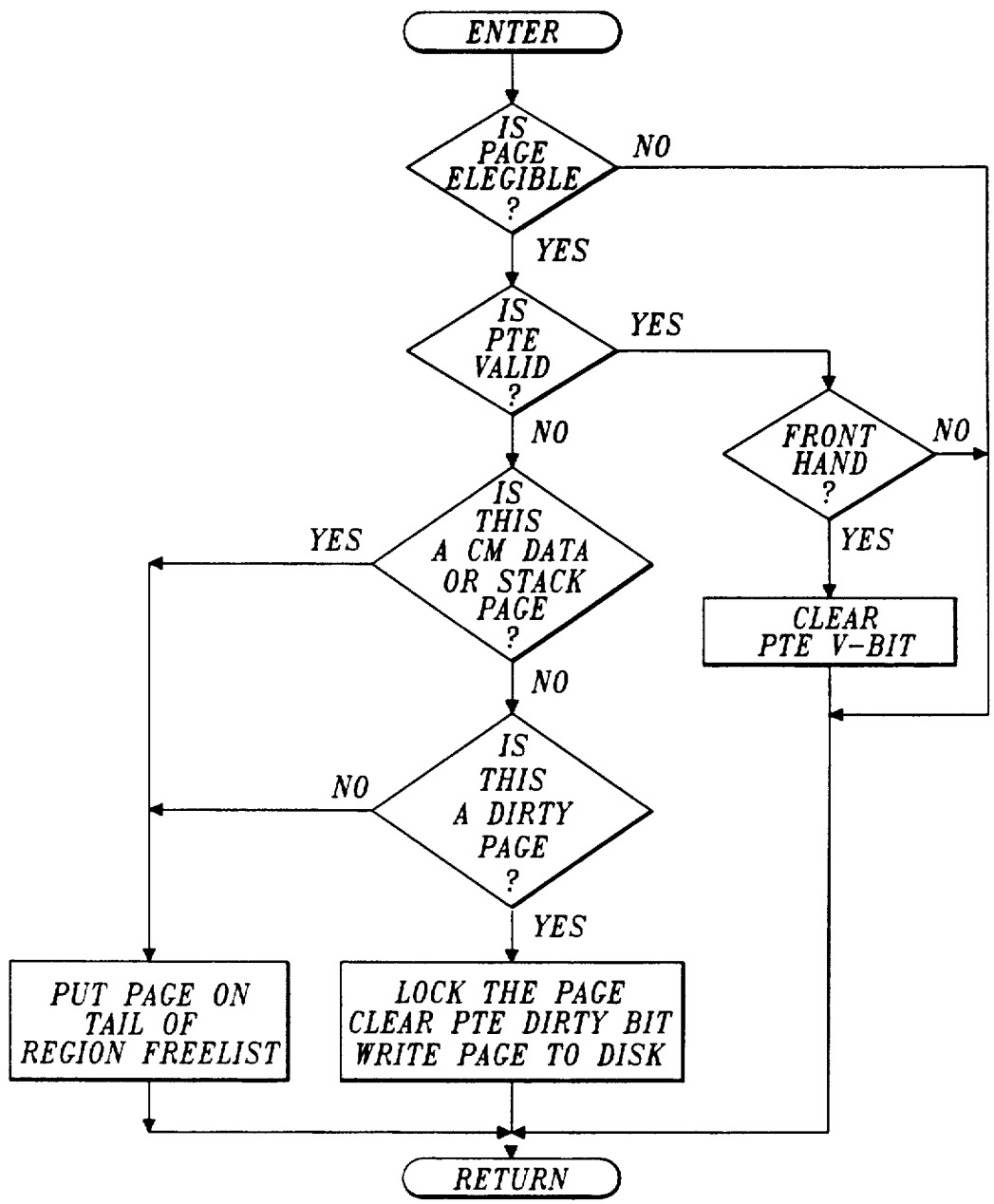
FIG. 12 is a flow diagram illustrating the steps taken to move a page from coupled or global memory further out of the memory hierarchy, namely to disk.

Free memory is maintained by a paging daemon process, the pertinent parts of which are illustrated in FIG. 12 and described below. In the original algorithm, which is described in detail in *The Design and Implementation of the 4.3BSD UNIX Operating System* by S. Leffler, M. K. McKusick, M. Karels, and J. S. Quartermain, Addison-Wesley, Reading, Mass., 1989, a front hand sweeps through the core map and invalidates the process PTE that points to the page. The back hand sweeps a fixed distance behind the front hand and, when it encounters a page that is still invalid, puts the page on the tail of the free page list. Modified pages are written to the swap device. A page fault on a page between the time the front hand invalidates the PTE and the back hand checks it will cause the page to be made valid and returned to the process, so that the backhand will not place it on the free list. This operation is called a fast reclaim. This scheme does not maintain per-process working sets. Instead, all processes page against the system memory. The kernel executes a schedpaging routine four times per second, which determines if free memory is in short supply. If free memory is in short supply, schedpaging will compute a page scan rate between slowscan and fastscan, and then set the number of pages to scan by the clock algorithm. The schedpaging routine will then wake up the paging daemon to execute the clock algorithm where free memory is in short supply, putting unused pages on the free list.

FIG. 12 is a detail from the paging daemon designed to support the migration of CM pages to global memory. As described in U.S. patent application Ser. No. 07/673,132, entitled Memory Management Method for Coupled Memory Multiprocessor Systems, the subject matter of which has been incorporated herein by reference, the paging daemon has been modified to work on a per region basis. That is, each memory region is paged individually, has its own free list, etc.

Returning now to FIG. 12, first, the paging daemon determines if a page is eligible for page out. The page must not be locked for I/O, not on the free list already, not a system page, and the owning process cannot be locked for swapping or about to exit. Ineligible pages are skipped. Next the PTE mapping the page is checked to see if it is valid. If the PTE is valid and the pointer is the front hand of the clock, the PTE valid bit is cleared and the paging daemon is finished. If the PTE is not valid and the page is a CM data or a stack page, the page is put on the tail of the free list and the paging daemon terminates. If the page is not a CM data or stack page and the page is not dirty, again the page is put on the tail of the free list. If the page is dirty, the page is locked, the PTE dirty flag is cleaned, and the I/O is initiated to write the page to disk. Later, when the I/O completes, the page is placed on the end of the free list.

As will be readily appreciated from the foregoing description, the invention provides an adaptive memory management method for coupled memory multiprocessor computer systems. The present invention is directed to making certain that the most referenced data and stack pages of processes assigned to individual multiprocessors are located in the memory region coupled to the assigned multiprocessor. More specifically, in a coupled memory multiprocessor system, all of the data and stack pages of processes assigned to individual multiprocessors are, preferably, located in a memory region coupled to the assigned processor. When this becomes impossible, some data and stack pages must be assigned to global memory (or the coupled memory regions associated with other processors). The present invention is a method of making certain that the most referenced data and stack pages are located in the coupled memory of the processor to which a specific process is assigned and that lesser referenced pages are located in global memory (or the coupled memory regions associated with other processors). This result is accomplished by sampling the memory references made by the processors of the computer system and causing the most recently referenced pages in each coupled memory region to be maintained at the head of an active page list. References to remote data and stack pages are stored in a remote page hash table. Remote pages are pages stored in global memory or in the coupled memory region of processors other than the one to which a specific process is assigned. Any remote pages referenced more frequently than pages stored in a processor's coupled memory are transferred to the processor's coupled memory. If a processor's coupled memory is tight, pages are transferred from the processor's coupled memory region to global memory, or in the case of systems that do not include global memory, the coupled memory region of other processors.

While a preferred embodiment of the invention has been illustrated and described, it will be appreciated that various changes can be made therein. Consequently, it is to be understood that, within the scope of the appended claims, the invention can be practiced otherwise than as specifically described herein.

The embodiments of the invention in which an exclusive property or privilege is claimed are defined as follows:

1. An adaptive memory management method for a coupled memory multiprocessor computer system comprising a plurality of CPU modules to which processes are assigned and a global interconnect, each of said CPU modules including a processor and a coupled memory region accessible by the processor without using the global interconnect, the coupled memory regions of other CPU modules being accessible by other processors via the global interconnect, said adaptive memory management method comprising the steps of:
   monitoring the memory references made by the processor of each CPU module;
   maintaining an active page list for each CPU module based on the references of the processor of the CPU module to the coupled memory region of the CPU module, the head of each of said active page lists being the most recently referenced page and the tail of said active page list being the least recently referenced page;
   maintaining a remote page hash table for each CPU module based on the frequency of references made by the processor of the CPU module to pages which are not located in the coupled memory region of the CPU module; and
   transferring pages that are not located in the coupled memory region of a CPU module and are referenced more frequently by the processor of the CPU module than pages located in the coupled memory region of the CPU module, to the coupled memory region of the CPU module.

2. An adaptive memory management method for a coupled memory multiprocessor computer system as claimed in claim 1, wherein:
   said step of monitoring the memory references made by the processor of each CPU module comprises the substeps of detecting the memory requests made by the processor of the CPU module, and storing samples of said memory requests; and
   said steps of maintaining an active page list and maintaining a remote page hash table are based on said stored samples.

3. An adaptive memory management method for a coupled memory multiprocessor computer system as claimed in claim 2, wherein both read and write memory request samples are detected and stored.

4. An adaptive memory management method for a coupled memory multiprocessor computer system as claimed in claim 1, wherein said steps of maintaining an active page list and maintaining a remote page table are accomplished by an adapt daemon running on each CPU module.

5. An adaptive memory management method for a coupled memory multiprocessor computer system as claimed in claim 4, wherein:
   said step of monitoring memory references made by the processor of each CPU module comprises the substeps of detecting the memory requests made by the processor of the CPU module and storing samples of said memory requests; and
   said steps of maintaining an active page list and maintaining a remote page hash table are based on said stored samples.

6. An adaptive memory management method for a coupled memory multiprocessor computer system as claimed in claim 5, wherein said adapt daemon periodically checks said stored samples and causes coupled memory pages referenced by the processor of the CPU module running the adapt daemon to be placed at the head of said active page list and uses said stored samples to maintain said remote page hash table.

7. An adaptive memory management method for a coupled memory multiprocessor computer system as claimed in claim 6, wherein said adapt daemon marks for migration to the coupled memory region of the CPU module running the adapt daemon frequently referenced pages not located in the coupled memory region of the CPU module.

8. An adaptive memory management method for a coupled memory multiprocessor computer system as claimed in claim 7, wherein the pages marked for migration by said adapt daemon form a migration array for each of said CPU modules.

9. An adaptive memory management method for a coupled memory multiprocessor computer system as claimed in claim 8, wherein said adapt daemon includes a collection phase, said collection phase including the steps of:
   evaluating said stored samples to determine if the samples relate to pages in the coupled memory region of the CPU module running the adapt daemon; and
   if related, placing the pages at the head of the active page list of said CPU module.

10. An adaptive memory management method for a coupled memory multiprocessor computer system as claimed in claim 9, wherein said collection phase also includes the step of determining whether the samples of pages not located in the coupled memory region of a CPU module to which a process is assigned are data or stack pages and using such information to maintain the remote page hash table for the related CPU module.

11. An adaptive memory management method for a coupled memory multiprocessor computer system as claimed in claim 10, wherein said collection phase also test the pages of said remote page hash table and adds pages from said remote page hash table to said migration array when the references to pages in said remote page hash table increase above a predetermined level.

12. An adaptive memory management method for a coupled memory multiprocessor computer system as claimed in claim 11, wherein said predetermined level is based on the number of references made by the processor of the CPU module to which a particular remote page hash table relates.

13. An adaptive memory management method for a coupled memory multiprocessor computer system as claimed in claim 12, wherein said adapt daemon includes a migration decision phase, said migration decision phase including the step of testing each of the pages in the migration array of the CPU module on which the adapt daemon is running to determine if the number of times each page has been referenced is above a second predetermined level, said second predetermined level greater than said first predetermined level and marking the pages that have been referenced above said second predetermined level for migration.

14. An adaptive memory management method for a coupled memory multiprocessor computer system as claimed in claim 13, wherein said migration decision phase also includes the step of determining if the amount of free memory of the coupled memory region of the CPU module running the adapt daemon is plentiful and, if plentiful relative to a predetermined level, marking for migration pages contained in said migration array lying between said first and second predetermined levels.

15. An adaptive memory management method for a coupled memory multiprocessor computer system as claimed in claim 14, wherein said migration decision phase also includes the step of determining the size of the process related to a particular page in said migration array and marking said page for migration even if the free memory of the coupled memory region of the CPU module running the adapt daemon is not plentiful.

16. An adaptive memory management method for a coupled memory multiprocessor computer system as claimed in claim 15, wherein said migration decision phase includes a disassociated page routine that tests pages to determine if they are migratable prior to said pages being marked for migration.

17. An adaptive memory management method for a coupled memory multiprocessor computer system as claimed in claim 16, wherein said step of transferring pages that are not located in the coupled memory region of a CPU module is performed by a page fault routine.

18. An adaptive memory management method for a coupled memory multiprocessor computer system as claimed in claim 17, wherein said page fault routine determines if pages are reclaimable and reclaims pages that are reclaimable.

19. An adaptive memory management method for a coupled memory multiprocessor computer system as claimed in claim 18, wherein said coupled memory multiprocessor computer system includes global memory and wherein said page fault routine allocates nonreclaimable data and stack pages to either global memory or the coupled memory region of the CPU module to which the process owning the data and stack pages is assigned based on whether said coupled memory region is in short supply.

20. An adaptive memory management method for a coupled memory multiprocessor computer system as claimed in claim 19, wherein said page fault routine tests reclaimable data or stack pages to determine if they are in the coupled memory region of the CPU module to which the process owning the reclaimable data and stack pages is assigned and if the reclaimable data or stack pages have been marked for migration and, if not in said coupled memory region and marked for migration, allocating a page in the coupled memory region of the CPU module, to which the process owning the reclaimable data or stack pages has been assigned, to one of the reclaimable data or stack pages.

21. An adaptive memory management method for a coupled memory multiprocessor computer system as claimed in claim 20, wherein said page fault routine also determines if the free memory of the coupled memory region to which a data or stack page is assigned is low and, if low, either takes away pages located at the end of the active page list of the process that owns the data and stack page, depending upon whether the data and stack pages stored in the coupled memory region of the CPU module assigned the process owning the data or stack page is above or below a predetermined level.

* * * * *

UNITED STATES PATENT AND TRADEMARK OFFICE
CERTIFICATE OF CORRECTION

PATENT NO. : 5,269,013
DATED : December 7, 1993
INVENTOR(S) : K. D. Abramson et al.

It is certified that error appears in the above-indentified patent and that said Letters Patent is hereby corrected as shown below:

| COLUMN | LINE | |
|---|---|---|
| 8 | 61 & 62 | "Therefor" should read --Therefore-- |
| 14 | 39 | "eleigible" should read --eligible-- |
| 20 | 3 | after "list" insert --of another process or takes away pages located at the end of the active page list-- |

Signed and Sealed this

Twenty-first Day of June, 1994

Attest:

BRUCE LEHMAN

*Attesting Officer*   *Commissioner of Patents and Trademarks*